(12) United States Patent  
Kuroda

(10) Patent No.: US 9,307,141 B2  
(45) Date of Patent: Apr. 5, 2016

(54) FOCUS DETECTION DEVICE, PHOTOELECTRIC CONVERSION SYSTEM, METHOD OF DRIVING FOCUS DETECTION DEVICE

(71) Applicant: CANON KABUSHIKI KAISHA, Tokyo (JP)

(72) Inventor: Yukihiro Kuroda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 14/486,010

(22) Filed: Sep. 15, 2014

(65) Prior Publication Data  
US 2015/0077620 A1 Mar. 19, 2015

(30) Foreign Application Priority Data  
Sep. 17, 2013 (JP) ................................. 2013-191569

(51) Int. Cl.  
*H04N 5/232* (2006.01)

(52) U.S. Cl.  
CPC ................................. *H04N 5/23212* (2013.01)

(58) Field of Classification Search  
CPC ........................ H04N 5/23212; H04N 5/3696  
See application file for complete search history.

(56) References Cited

U.S. PATENT DOCUMENTS

| | | | | |
|---|---|---|---|---|
| 5,546,127 A | * | 8/1996 | Yamashita | ......... H04N 5/23245 348/297 |
| 6,141,049 A | * | 10/2000 | Harada | ............. H01L 27/14831 257/E27.154 |
| 2015/0097997 A1 | * | 4/2015 | Mitsunaga | ......... H04N 5/23248 348/296 |

FOREIGN PATENT DOCUMENTS

| | | |
|---|---|---|
| JP | 2001-305422 A | 10/2001 |
| JP | 2011-139427 A | 7/2011 |
| JP | 2012-048064 A | 3/2012 |

* cited by examiner

*Primary Examiner* — Tuan Ho  
(74) *Attorney, Agent, or Firm* — Canon U.S.A., Inc. IP Division

(57) ABSTRACT

A focus detection device, a photoelectric conversion system, and a method of driving the focus detection device are provided in which a length of an electric charge accumulation period is determined based on a signal level based on an electric charge accumulated by a photoelectric converter in a sub-accumulation period.

21 Claims, 9 Drawing Sheets

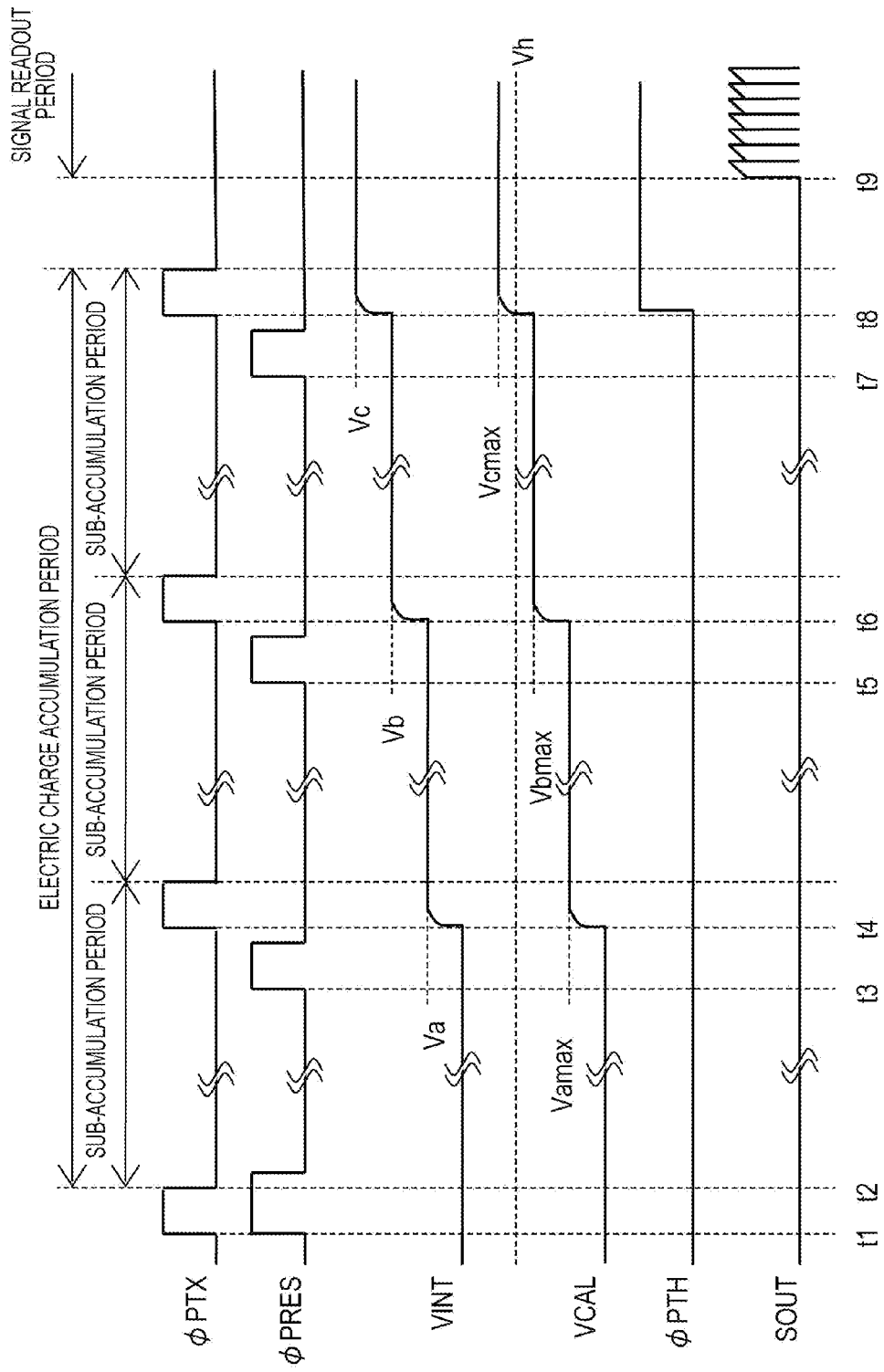

FOCUS DETECTION DEVICE, PHOTOELECTRIC CONVERSION SYSTEM, METHOD OF DRIVING FOCUS DETECTION DEVICE

BACKGROUND OF THE INVENTION

1. Field of the Invention

The present invention relates to a focus detection device that generates an electric charge based on incoming light through photoelectric conversion.

2. Description of the Related Art

Japanese Patent Application Laid-Open No. 2012-48064 describes a focus detection device that includes a first photoelectric conversion unit and a second photoelectric conversion unit disposed near the first photoelectric conversion unit. The focus detection device described in Japanese Patent Application Laid-Open No. 2012-48064 compares to a threshold the signal level of a signal based on an electric charge of the first photoelectric conversion unit during an electric charge accumulation period for the second photoelectric conversion unit. When the signal level of the signal based on the electric charge of the first photoelectric conversion unit exceeds the threshold, the electric charge accumulation period for the second photoelectric conversion unit is finished. When the electric charge accumulation period is finished, the electric charge accumulated in the second photoelectric conversion unit is transferred through a transfer switch to the input node of an output section that outputs a signal based on the electric charge.

Japanese Patent Application Laid-Open No. 2011-139427 describes a focus detection device that includes a photoelectric converter and a unit cell. The photoelectric converter accumulates an electric charge during an electric charge accumulation period. The unit cell keeps outputting a signal based on the electric charge during the electric charge accumulation period. The focus detection device described in Japanese Patent Application Laid-Open No. 2011-139427 also includes a monitoring unit that compares the signal based on the electric charge to a threshold. In a photoelectric conversion device described in Japanese Patent Application Laid-Open No. 2011-139427, the monitoring unit finishes the electric charge accumulation period for the photoelectric converter when the signal based on the electric charge exceeds the threshold in amplitude.

SUMMARY OF THE INVENTION

An aspect of the invention is a focus detection device, including a plurality of unit cells and an arithmetic operation circuit, the unit cells each including: a photoelectric converter; a transfer switch configured to transfer an electric charge accumulated by the photoelectric converter; and an output section configured to output a signal based on the electric charge transferred when the transfer switch is turned on, wherein the output section outputs a plurality of signals based on electric charges obtained in a plurality of sub-accumulation periods included in an electric charge accumulation period, and the arithmetic operation circuit determines a length of the electric charge accumulation period based on signal levels of the plurality of signals.

Another aspect of the invention is a focus detection device, including a plurality of unit cells and an arithmetic operation circuit, the unit cells each including: a photoelectric converter configured to accumulate an electric charge based on incoming light in a sub-accumulation period; a transfer switch configured to transfer the electric charge accumulated by the photoelectric converter; and an output section configured to output a signal based on the electric charge transferred when the transfer switch is turned on, wherein the arithmetic operation circuit determines a length of an electric charge accumulation period based on a signal level of the signal output by the output section included in each of the unit cells, the electric charge accumulation period being a period in which the photoelectric converter accumulates an electric charge, the electric charge accumulation period being provided after the sub-accumulation period.

Still another aspect of the invention is a focus detection device, including a plurality of unit cells and an arithmetic operation circuit, the unit cells each including: a photoelectric converter configured to accumulate an electric charge based on incoming light in a sub-accumulation period; a transfer switch configured to transfer the electric charge accumulated by the photoelectric converter; and an output section configured to output a signal based on the electric charge transferred when the transfer switch is turned on, wherein the output section outputs a signal based on an electric charge resulting from summation of electric charges obtained in a plurality of sub-accumulation periods included in an electric charge accumulation period, and the arithmetic operation circuit determines a length of the electric charge accumulation period based on a signal level of the signal output by the output section included in each of the unit cells, the electric charge accumulation period being a period in which the photoelectric converter accumulates the electric charges.

Yet another aspect of the invention is a method of driving a focus detection device, the focus detection device including a plurality of unit cells, the unit cells each including: a photoelectric converter; a transfer switch configured to transfer an electric charge accumulated by the photoelectric converter; and an output section configured to output a signal based on the electric charge transferred when the transfer switch is turned on, the method including: outputting, by the output section, a plurality of signals based on electric charges obtained in a plurality of sub-accumulation periods included in an electric charge accumulation period; and determining a timing to finish the electric charge accumulation period based on signal levels of the plurality of signals, the electric charge accumulation period being a period in which the photoelectric converter accumulates the electric charges.

Yet another aspect of the invention is a method of driving a focus detection device, the focus detection device including a plurality of unit cells, the unit cells each including: a photoelectric converter configured to accumulate an electric charge based on incoming light in a sub-accumulation period; a transfer switch configured to transfer the electric charge accumulated by the photoelectric converter; and an output section configured to output a signal based on the electric charge transferred when the transfer switch is turned on, the method including: determining a length of an electric charge accumulation period based on a signal level of the signal from each of the unit cells, the electric charge accumulation period being a period in which the photoelectric converter accumulates an electric charge, the electric charge accumulation period being provided after the sub-accumulation period.

Further features of the present invention will become apparent from the following description of exemplary embodiments (with reference to the attached drawings).

BRIEF DESCRIPTION OF THE DRAWINGS

FIG. 2B is a diagram of an exemplary operation of the focus detection device.

DESCRIPTION OF THE EMBODIMENTS

The focus detection device described in Japanese Patent Application Laid-Open No. 2012-48064 uses the signal based on the electric charge of the first photoelectric conversion unit, which is provided separately from the second photoelectric conversion unit, to determine the timing to finish the electric charge accumulation period for the second photoelectric conversion unit. Thus, the electric charge accumulation period for the second photoelectric conversion unit may be finished at an inappropriate timing if the first photoelectric conversion unit and the second photoelectric conversion unit have mutually different incoming light quantities.

Japanese Patent Application Laid-Open No. 2011-139427 does not describe a focus detection device that includes a unit cell including a transfer switch that transfers the electric charge accumulated in the photoelectric converter to an output section provided in the unit cell for outputting a signal based on an electric charge of the photoelectric converter.

It is an object of the present invention to provide a focus detection device that includes a unit cell provided with a transfer switch and facilitates providing a more appropriate timing to finish an electric charge accumulation period for a photoelectric converter, in comparison with a conventional device.

Some embodiments of the focus detection device will now be described with reference to the drawings.

First Embodiment

Figure 1:
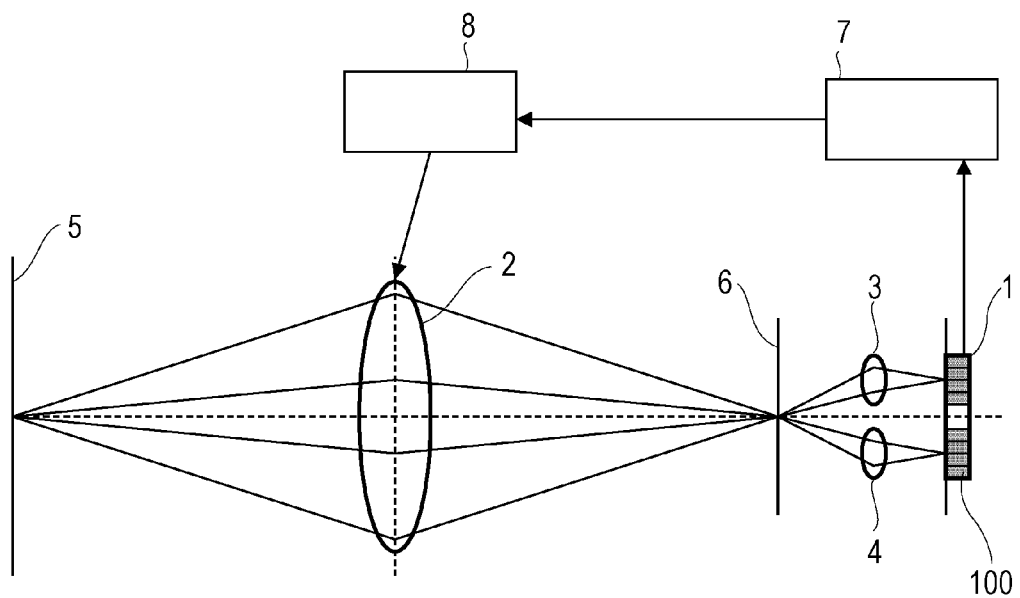
FIG. 1 is a diagram of an exemplary arrangement of a photoelectric conversion system.

FIG. 1 is a diagram of a photoelectric conversion system including a focus detection device according to an embodiment.

The photoelectric conversion system in FIG. 1 includes a focus detection device 1. The focus detection device 1 includes a plurality of unit cells 100. The photoelectric conversion system also includes an imaging lens 2, and secondary imaging lenses 3 and 4. Light coming in from a subject 5 through the imaging lens 2 strikes the secondary imaging lenses 3 and 4. The incoming light from the subject 5 is split into two beams by the secondary imaging lenses 3 and 4. The resultant two beams of the incoming light enter the focus detection device 1. The focus detection device 1 outputs signals based on the two beams of the incoming light to an arithmetic processing section 7. The arithmetic processing section 7 detects a deviation from a focus on an imaging plane 6 in a way that is based on the signals input from the focus detection device 1. The arithmetic processing section 7 then controls a lens drive section 8 in a manner such that the detected deviation from the focus on the imaging plane 6 is reduced. The lens drive section 8 drives the imaging lens 2 under the control of the arithmetic processing section 7. The photoelectric conversion system is thus capable of achieving focus on the imaging plane 6 by driving the imaging lens 2 based on a result of focus detection by the arithmetic processing section 7. The imaging lens 2 constitutes an optical module that introduces the incoming light into the focus detection device 1.

Figure 2A:
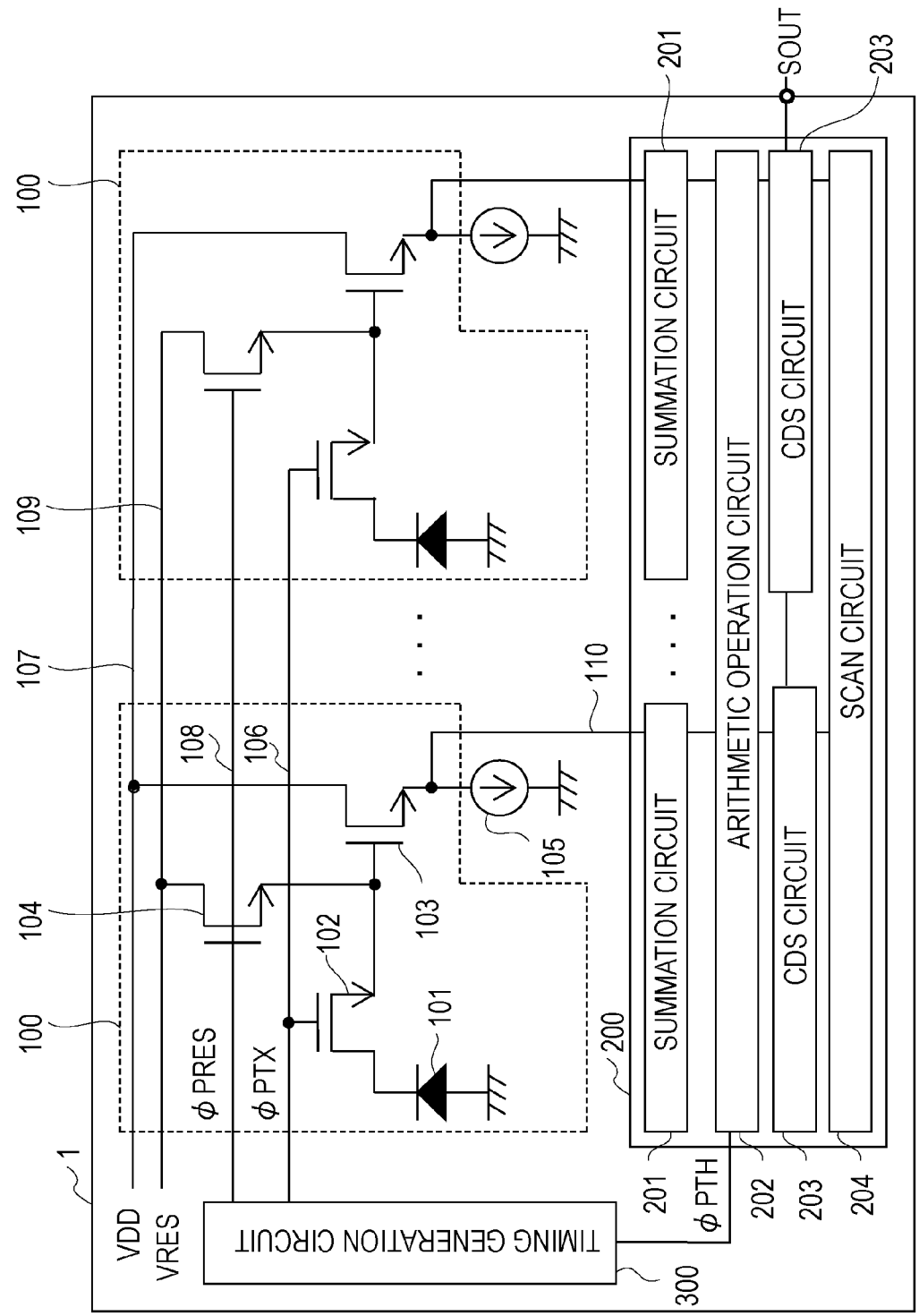
FIG. 2A is a diagram of an exemplary arrangement of a focus detection device.

FIG. 2A is a diagram of the focus detection device 1 illustrated in FIG. 1.

The focus detection device 1 includes the unit cells 100. The focus detection device 1 also includes a current source 105 associated with each unit cell 100. The focus detection device 1 also includes a vertical output line 110 associated with each unit cell 100. The focus detection device 1 also includes a signal processing section 200 and a timing generation circuit 300.

Each unit cell 100 includes a photoelectric converter 101, a transistor 102, a transistor 103, and a transistor 104. The timing generation circuit 300 outputs a signal $\phi$PTX through a transfer control line 106 to a control node of the transistor 102. The transistor 102 is a transfer switch that transfers an electric charge generated in the photoelectric converter 101 to an input node of the transistor 103. When the timing generation circuit 300 allows the signal $\phi$PTX to achieve a high level (hereinafter referred to as H level), the transistor 102 is turned on. The transistor 102, which has been turned on, transfers the electric charge of the photoelectric converter 101 to the input node of the transistor 103. A power supply line 107 supplies voltage VDD to a main node of the transistor 103. The current source 105 supplies current to the transistor 103 and the vertical output line 110. The power supply line 107, the transistor 103, and the current source 105 constitute a source follower circuit. This allows the transistor 103 to output to the vertical output line 110 a signal based on the electric charge transferred to the input node of the transistor 103. The transistor 103 is an output section that outputs a signal based on an electric charge of the photoelectric converter 101.

The timing generation circuit 300 outputs a signal $\phi$PRES through a reset control line 108 to a control node of the transistor 104. A reset power supply line 109 supplies voltage VRES to a main node of the transistor 104. Another main node of the transistor 104 is connected electrically to the input node of the transistor 103. When the timing generation circuit 300 allows the signal $\phi$PRES to achieve the H level, the potential of the input node of the transistor 103 is reset to a potential based on the voltage VRES.

The signal processing section 200 includes a summation circuit 201 associated with each unit cell 100. The signal processing section 200 also includes an arithmetic operation circuit 202. The signal processing section 200 also includes a CDS circuit 203 associated with each unit cell 100. The signal processing section 200 also includes a scan circuit 204 that scans the CDS circuits 203 sequentially. A signal output from each unit cell 100 to the associated vertical output line 110 is input into the associated summation circuit 201. The summation circuit 201 generates a signal resulting from summation of signals output by the associated unit cell 100 over multiple times to the vertical output line 110. The arithmetic operation circuit 202 receives signals from the summation circuits 201 associated with the arithmetic operation circuit 202 and detects a signal having a maximum value from among the signals input from the summation circuits 201. The arithmetic operation circuit 202 outputs a signal φPTH, which is indicative of a result of comparison between the signal having the maximum value and a signal level at which an electric charge accumulation period for the photoelectric converters 101 is finished, to the timing generation circuit 300. The timing generation circuit 300 determines whether to continue or finish the electric charge accumulation period for the photoelectric converters 101 based on the signal value of the signal φPTH.

The CDS circuits 203 output to a terminal SOUT signals resulting from correlated double sampling (CDS) processing performed on signals input from the arithmetic operation circuit 202. The signals output from the terminal SOUT are the signals output by the focus detection device 1.

FIG. 2B is a timing chart of an operation of the focus detection device 1 illustrated in FIG. 2A.

FIG. 2B includes VINT, which represents a signal output by one of the summation circuits 201 illustrated in FIG. 2A to the arithmetic operation circuit 202. FIG. 2B also includes VCAL, which represents a signal generated by the arithmetic operation circuit 202 based on signals input from the summation circuits 201.

At a time t1, the timing generation circuit 300 turns the signals φPTX and φPRES from a low level (hereinafter referred to as L level) to the H level. This resets the electric charges at the photoelectric converter 101 and the input node of the transistor 103.

At a time t2, the timing generation circuit 300 turns the signal φPTX from the H level to the L level. At this time, the photoelectric converter 101 starts accumulating an electric charge based on the incoming light. In other words, the time t2 is a timing to start the electric charge accumulation period for the photoelectric converters 101. The timing generation circuit 300 then turns the signal φPRES from the H level to the L level. The transistor 103 in the unit cell 100 outputs to the vertical output line 110 a signal based on the potential of its input node having the electric charge that has been reset. This signal is referred to as a noise signal. The associated CDS circuit 203 retains the noise signal of the unit cell 100 input through the vertical output line 110, the summation circuit 201, and the arithmetic operation circuit 202.

At a time t3, the timing generation circuit 300 turns the signal φPRES from the L level to the H level. This resets the electric charge at the input node of the transistor 103 again. The timing generation circuit 300 then turns the signal φPRES from the H level to the L level.

At a time t4, the timing generation circuit 300 turns the signal φPTX from the L level to the H level. This allows the electric charge accumulated in the photoelectric converter 101 during a period from the time t2 to the time t3 to be transferred to the input node of the transistor 103. The period from the time t2 to the time t3 is referred to as a sub-accumulation period. The transistor 103 outputs a signal based on the electric charge accumulated in the photoelectric converter 101 during the sub-accumulation period (such signal being referred to as a photoelectric conversion signal hereinafter) to the vertical output line 110. The summation circuit 201 retains the photoelectric conversion signal input from the associated unit cell 100. The signal VINT output by the summation circuit 201 has a signal level at Va. The arithmetic operation circuit 202 receives photoelectric conversion signals from the summation circuits 201. The arithmetic operation circuit 202 detects a signal at Vamax, which is the maximum value, from among the photoelectric conversion signals input from the summation circuits 201. This allows the arithmetic operation circuit 202 to retain the signal VCAL having a signal level at Vamax. The arithmetic operation circuit 202 generates a signal φPTH, which is indicative of a result of the comparison between the signal VCAL and a signal level Vh at which the electric charge accumulation period for the photoelectric converters 101 is finished. In the operation illustrated in FIG. 2B, the signal VCAL has the level Vamax with an amplitude smaller than that of the signal level Vh, causing the signal φPTH to remain at the L level. The timing generation circuit 300 repeats the sub-accumulation period because the signal φPTH is at the L level. The electric charge accumulation period for the photoelectric converters 101 is continued in this manner. The timing generation circuit 300 then turns the signal φPTX from the H level to the L level. This causes the photoelectric converter 101 to accumulate an electric charge again in another sub-accumulation period.

At a time t5, the focus detection device 1 performs an operation similar to the operation described for the time t3. At a time t6, the focus detection device 1 performs an operation similar to the operation described for the time t4.

Through this operation, the summation circuit 201 outputs the signal VINT at a signal level Vb resulting from adding another photoelectric conversion signal output by the unit cell 100 and the retained signal level Va. The arithmetic operation circuit 202 detects a signal at Vbmax, which is the maximum value, from among the photoelectric conversion signals input from the summation circuits 201. The signal VCAL has a signal level Vbmax with an amplitude smaller than that of the signal level Vh, causing the signal φPTH to remain at the L level. The timing generation circuit 300 repeats the sub-accumulation period because the signal φPTH is at the L level. The electric charge accumulation period for the photoelectric converters 101 is continued in this manner.

At a time t7, the focus detection device 1 performs an operation similar to the operation described for the time t3. At a time t8, the focus detection device 1 performs an operation similar to the operation described for the time t4.

Through this operation, the summation circuit 201 outputs the signal VINT at a signal level Vc resulting from adding another photoelectric conversion signal output by the unit cell 100 and the retained signal level Vb. The arithmetic operation circuit 202 detects a signal at Vcmax, which is the maximum value, from among the photoelectric conversion signals input from the summation circuits 201. The signal VCAL has a signal level Vcmax with an amplitude larger than that of the signal level Vh, causing the signal φPTH to turn from the L level to the H level. The timing generation circuit 300 finishes repeating the sub-accumulation period because the signal φPTH is at the H level. The electric charge accumulation period for the photoelectric converters 101 is finished in this manner.

The arithmetic operation circuit 202 then outputs the photoelectric conversion signals of the summation circuits 201 to the respective CDS circuits 203. The CDS circuits 203 each generate a signal of difference between the photoelectric conversion signal that has been input and the retained noise signal (such a signal of difference being referred to as post-CDS signal hereinafter). In this manner, a post-CDS signal can be obtained with reduced noise due to variation in characteristic of the photoelectric converters 101, variation in characteristic of the transistors 103, and variation in characteristic of the summation circuits 201.

At a time t9, the scan circuit 204 starts scanning the CDS circuit 203 in each column sequentially. This enables the CDS circuit 203 in each column to output a post-CDS signal sequentially to the terminal SOUT.

The focus detection device 1 according to this embodiment allows the summation circuits 201 to each generate a sum signal resulting from the summation of photoelectric conversion signals from every sub-accumulation period. The arithmetic operation circuit 202 then compares the maximum value from the sum signals and the signal level Vh at which the electric charge accumulation period for the photoelectric converters 101 is finished. The focus detection device 1 then finishes repeating the sub-accumulation period when the maximum value from the sum signals exceeds the signal level Vh. The electric charge accumulation period for the photoelectric converters 101 is finished in this manner.

If the timing to finish the electric charge accumulation period for the photoelectric converters 101 is determined based on a photoelectric conversion signal based on a photoelectric converter 101 different from these photoelectric converters 101, the timing to finish the electric charge accumulation period may be inappropriate because of a difference in incoming light quantity. In contrast, the focus detection device 1 according to the embodiment determines the timing to finish the electric charge accumulation period for the photoelectric converters 101 based on a photoelectric conversion signal based on these photoelectric converters 101. This facilitates providing an appropriate timing to finish the electric charge accumulation period for the photoelectric converters 101. By allowing the focus detection device 1 to output with ease photoelectric conversion signals based on an appropriate electric charge accumulation period, the photoelectric conversion system achieves an improved focusing accuracy.

For a unit cell 100 including no transistor 102, the input node of a transistor 103 would continue to accumulate the electric charge of a photoelectric converter 101 over the sub-accumulation periods. This causes dark current noise generated at the input node of the transistor 103 to increase with the increase in length of the sub-accumulation periods. In contrast, the focus detection device according to the embodiment includes the transfer switch, which turns on for every sub-accumulation period, allowing the potential at the input node of the transistor 103 to be reset for every sub-accumulation period. In this manner, the focus detection device according to the embodiment allows the unit cell 100 to output a signal with reduced dark current noise at the input node of the transistor 103. Thus, the photoelectric conversion system according to the embodiment is capable of providing improved accuracy of focus detection in comparison with a system with a unit cell 100 including no transistor 102.

In this embodiment, the timing to finish the electric charge accumulation period is determined based on a photoelectric conversion signal based on the photoelectric converters 101. In another example, the timing to finish the electric charge accumulation period for a first photoelectric converter 101, which is one photoelectric converter 101, may be determined based on a signal based on the first photoelectric converter 101.

Additionally, in this embodiment, the timing to finish the electric charge accumulation period is determined based on a signal resulting from the summation by the summation circuit 201 of signals output by the unit cell 100 over multiple times. In another example, a signal resulting from averaging of signals output by the unit cell 100 over n times (where n is a natural number) may be generated. The averaged signal may be then multiplied by n to obtain a signal level for comparison to the signal level Vh. The timing generation circuit 300 may determine the timing to finish the electric charge accumulation period based on a result of this comparison.

Although the focus detection device according to the embodiment repeats the sub-accumulation period having a constant length, a sub-accumulation period may have a different length from another sub-accumulation period.

Additionally, the focus detection device according to the embodiment allows the summation circuit 201 to sum signals output by the output section of the unit cell 100. In another example, the input node of the transistor 103 may sum electric charges of the photoelectric converter 101 from every sub-accumulation period. The output section of the unit cell 100 may then output a signal based on the sum electric charge to the arithmetic operation circuit 202. The arithmetic operation circuit 202 may then determine the timing to finish the electric charge accumulation period for the photoelectric converters 101 based on the signal levels of the signals output by the output sections of the plurality of unit cells 100.

Second Embodiment

A focus detection device according to another embodiment will now be described with emphasis on differences from the first embodiment.

For the focus detection device according to the first embodiment, the timing to finish the electric charge accumulation period is determined based on the maximum value from the photoelectric conversion signals based on the photoelectric converters 101. For the focus detection device according to this embodiment, the timing to finish the electric charge accumulation period is determined based on a minimum value and a maximum value from photoelectric conversion signals based on photoelectric converters 101.

The focus detection device according to the embodiment has an arrangement similar to that illustrated in FIG. 2A.

An operation of the focus detection device according to the embodiment will now be described with reference to FIG. 3.

Figure 3:
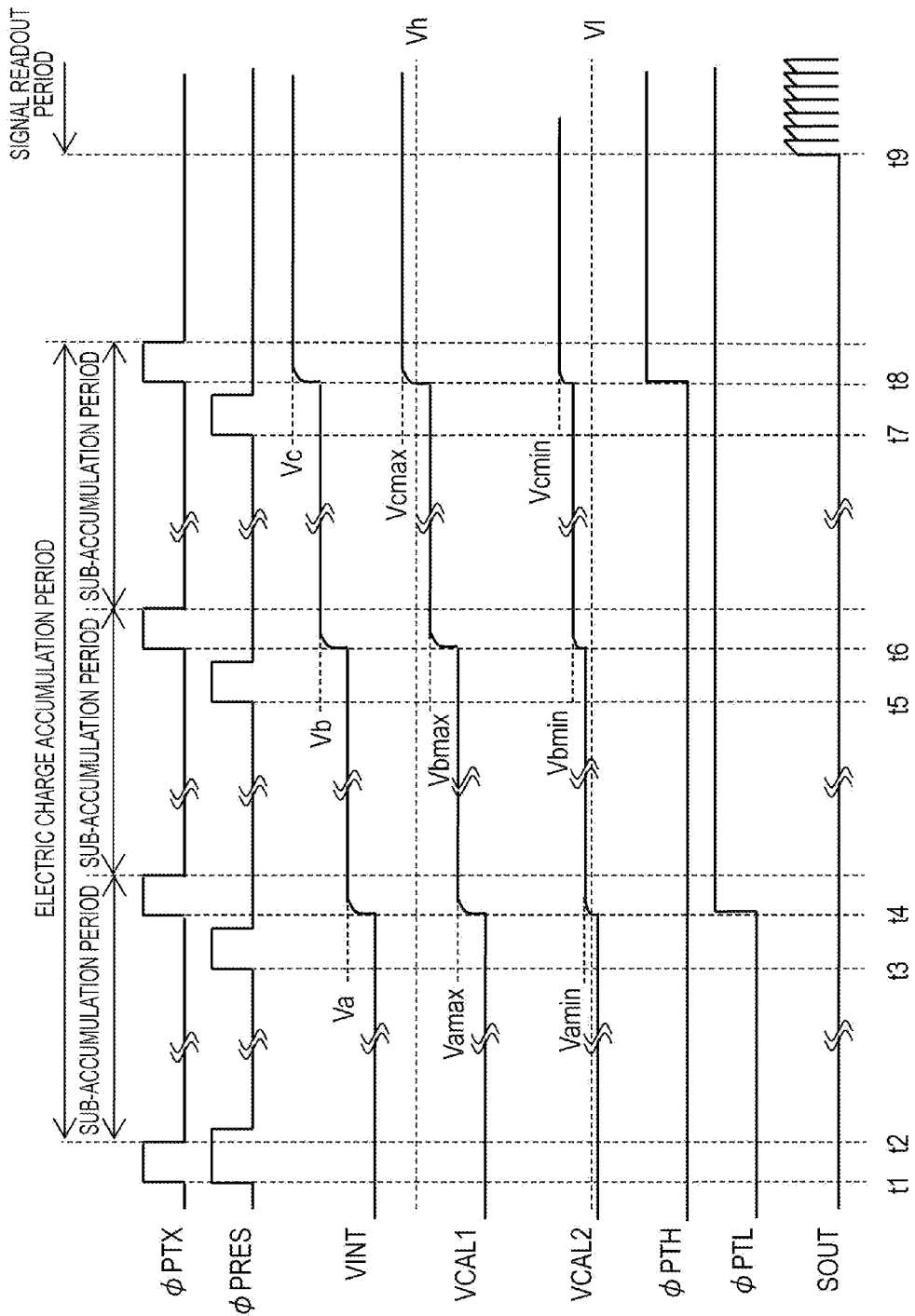
FIG. 3 is a diagram of an exemplary operation of a focus detection device.

A signal VCAL1 illustrated in FIG. 3 is a signal having the maximum value detected by an arithmetic operation circuit 202 from among signals input from summation circuits 201. A signal VCAL2 is a signal having the minimum value detected by the arithmetic operation circuit 202 from among the signals input from the summation circuits 201.

A signal φPTL illustrated in FIG. 3 is a signal output by the arithmetic operation circuit 202 to a timing generation circuit 300. The timing generation circuit 300 finishes repeating the sub-accumulation period when signal values of the signals φPTH and φPTL both achieve the H level. The electric charge accumulation period for the photoelectric converters 101 is finished in this manner.

Signal levels Vl and Vh illustrated in FIG. 3 serve as thresholds to determine the timing to finish the electric charge accumulation period for the photoelectric converters 101. The timing generation circuit 300 according to the embodiment finishes repeating the sub-accumulation period when the signal VCAL1 has an amplitude larger than that of the signal level Vh and the signal VCAL2 has an amplitude larger than that of the signal level Vl. The electric charge accumulation period for the photoelectric converters 101 is finished in this manner.

Operations of the timing generation circuit 300 at times t1, t2, and t3 are similar to those at the times t1, t2, and t3 described with reference to FIG. 2B.

At a time t4, the timing generation circuit 300 turns a signal φPTX from the L level to the H level. This allows unit cells 100 to output photoelectric conversion signals to the respective summation circuits 201. The summation circuits 201 each output a photoelectric conversion signal to the arithmetic operation circuit 202. The signal VCAL1 has a signal level at Vamax. The signal level Vamax has an amplitude smaller than that of the signal level Vh, causing the signal φPTH to remain at the L level. The signal VCAL2 has a signal level at Vamin. The signal level Vamin has an amplitude larger than that of the signal level Vl, causing the signal φPTL to turn from the L level to the H level. The timing generation circuit 300 repeats the sub-accumulation period because the signal φPTH is at the L level. The electric charge accumulation period for the photoelectric converters 101 is continued in this manner.

The timing generation circuit 300 then turns the signal φPTX from the H level to the L level.

An operation at a time t5 is similar to that at the time t5 described with reference to FIG. 2B.

At a time t6, the timing generation circuit 300 turns the signal φPTX from the L level to the H level again. This allows the unit cells 100 to output photoelectric conversion signals to the respective summation circuits 201. The summation circuits 201 each output to the arithmetic operation circuit 202 a sum signal resulting from adding the photoelectric conversion signal that has been input this time and the photoelectric conversion signal that has been input at the time t4. The signal VCAL1 has a signal level at Vbmax, and the signal VCAL2 has a signal level at Vbmin. The signal level Vbmax has an amplitude smaller than that of the signal level Vh, causing the signal φPTH to remain at the L level. Thus, the timing generation circuit 300 repeats the sub-accumulation period. The electric charge accumulation period for the photoelectric converters 101 is continued in this manner.

The timing generation circuit 300 then turns the signal φPTX from the H level to the L level.

An operation at a time t7 is similar to that at the time t7 described with reference to FIG. 2B.

At a time t8, the timing generation circuit 300 turns the signal φPTX from the L level to the H level again. This allows the unit cells 100 to output photoelectric conversion signals to the respective summation circuits 201. The summation circuits 201 each output to the arithmetic operation circuit 202 a sum signal resulting from adding the photoelectric conversion signal that has been input and the photoelectric conversion signal that has been retained. The signal VCAL1 has a signal level at Vcmax, and the signal VCAL2 has a signal level at Vcmin. The signal level Vcmax has an amplitude larger than that of the signal level Vh, causing the signal φPTH to turn from the L level to the H level. Thus, the timing generation circuit 300 finishes repeating the sub-accumulation period. The electric charge accumulation period for the photoelectric converters 101 is finished in this manner.

The arithmetic operation circuit 202 then outputs the sum signals of the summation circuits 201 to respective CDS circuits 203. After a time t9, the CDS circuits 203 output post-CDS signals to the terminal SOUT through scanning by a scan circuit 204.

The focus detection device according to the embodiment determines the timing to finish the electric charge accumulation period for the photoelectric converters 101 based on the maximum value and the minimum value from the sum signals. This allows the electric charge accumulation period to be finished when photoelectric conversion signals based on the photoelectric converters 101 have signal levels within a desired range, in contrast to the focus detection device according to the first embodiment. Thus, the electric charge accumulation period can be finished at a more appropriate timing in comparison with the focus detection device 1 according to the first embodiment.

Although the focus detection device according to the embodiment repeats the sub-accumulation period having a constant length, a sub-accumulation period may have a different length from another sub-accumulation period.

Additionally, the focus detection device according to the embodiment outputs a result of the operation of the signal processing section 200 to the timing generation circuit 300. In another example, the signal processing section 200 may output a result of the operation through another section of the focus detection device or a section outside the focus detection device.

Third Embodiment

A focus detection device according to another embodiment will now be described with emphasis on difference from the first embodiment. For the focus detection device according to this embodiment, the length of the electric charge accumulation period is determined based on a timing at which a signal VCAL has reached a first signal level and a timing at which the signal VCAL has reached a second signal level.

The focus detection device according to the embodiment has an arrangement similar to that illustrated in FIG. 2A.

Figure 4:
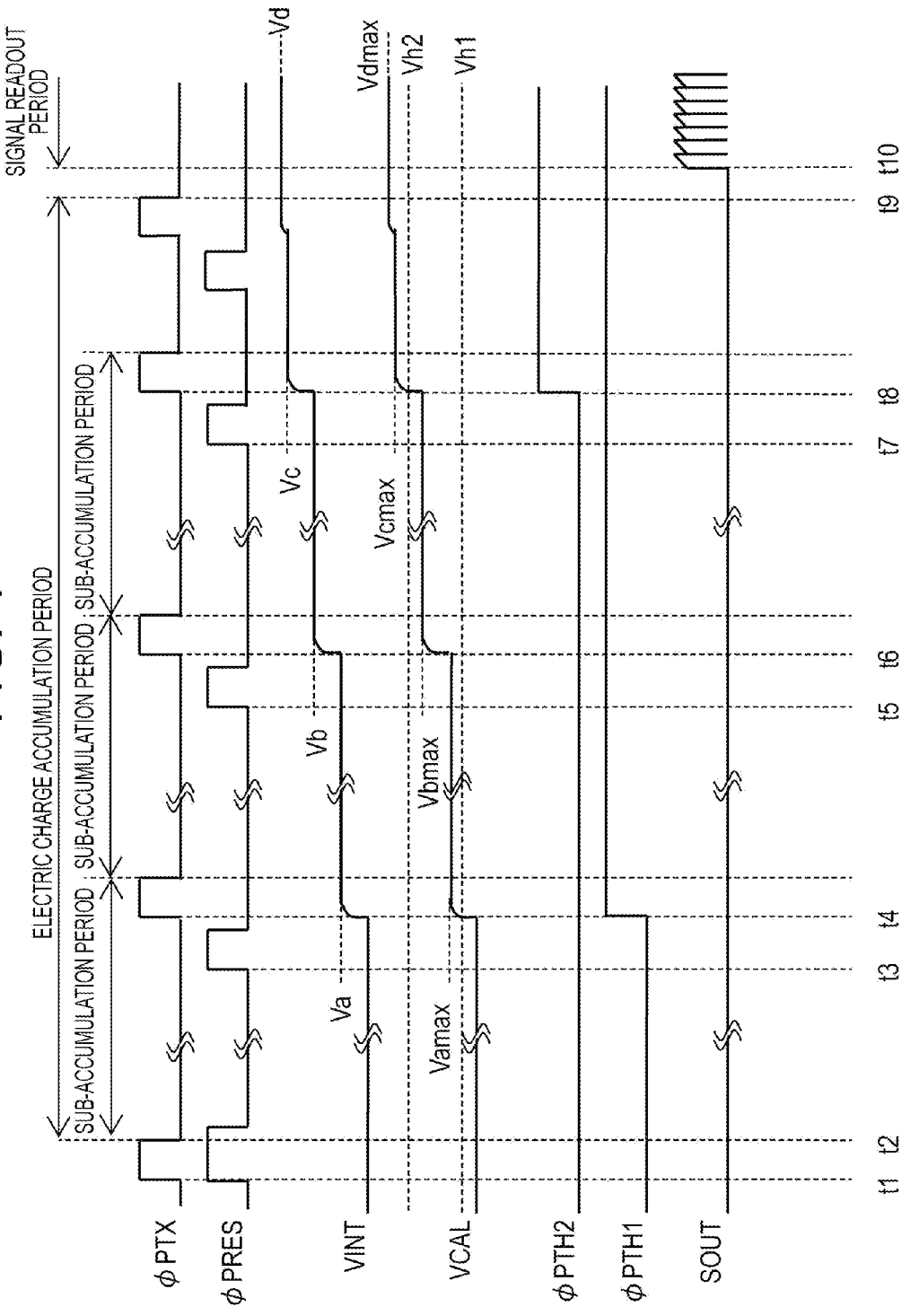
FIG. 4 is a diagram of an exemplary operation of a focus detection device.

An operation of the focus detection device according to the embodiment will now be described with reference to FIG. 4.

The focus detection device according to the embodiment determines the length of the electric charge accumulation period based on the timing at which the signal VCAL has reached a signal level Vh1 and the timing at which the signal VCAL has reached a signal level Vh2 so that the signal VCAL achieves Vdmax.

A signal φPTH1 indicates a result of comparison by an arithmetic operation circuit 202 between the signal level Vh1 and a signal level of the signal VCAL. A signal φPTH2 indicates a result of comparison by the arithmetic operation circuit 202 between the signal level Vh2 and a signal level of the signal VCAL.

Operations from a time t1 to a time t4 are similar to those at the time t1 to the time t4 described with reference to FIG. 3.

At the time t4, the signal φPTH1 turns from the L level to the H level. The arithmetic operation circuit 202 stores the time t4 as the timing at which the signal φPTH1 has turned from the L level to the H level.

Operations from a time t5 to a time t8 are similar to those from the time t5 to the time t8 described with reference to FIG. 3.

At the time t8, the signal φPTH2 turns from the L level to the H level. The arithmetic operation circuit 202 stores the time t8 as the timing at which the signal φPTH2 has turned from the L level to the H level.

The arithmetic operation circuit 202 calculates the length from the time t4 to the time t8, which is the length since the signal φPTH1 has achieved the H level until the signal φPTH2 has achieved the H level. The arithmetic operation circuit 202 then calculates an increase amount of the signal VCAL per unit time. The arithmetic operation circuit 202 then calculates a time at which the signal VCAL is to reach a signal level Vdmax. The time thus calculated is a time t9 at which the signal VCAL is projected to reach the signal level Vdmax. The arithmetic operation circuit 202 outputs to a timing generation circuit 300 the time t9 as the time at which the signal VCAL is projected to reach the signal level Vdmax.

The timing generation circuit 300 turns the signal φPTX from the H level to the L level at the time t9 based on the information input from the arithmetic operation circuit 202. The signal VCAL achieves the signal level Vdmax in this manner.

The arithmetic operation circuit 202 then outputs sum signals of summation circuits 201 to respective CDS circuits 203. After a time t10, the CDS circuits 203 output post-CDS signals to the terminal SOUT through scanning by a scan circuit 204.

The focus detection device according to the embodiment determines the length of the electric charge accumulation period based on the timing at which the signal VCAL has reached the first signal level and the timing at which the signal VCAL has reached the second signal level. This allows the focus detection device according to the embodiment to determine the length of the electric charge accumulation period so that unit cells 100 output photoelectric conversion signals at suitable signal levels in this length.

Fourth Embodiment

A focus detection device according to another embodiment will now be described with emphasis on differences from the first embodiment. For the focus detection device according to this embodiment, a signal level of a photoelectric conversion signal based on a sub-accumulation period for photoelectric converters 101 is used to control the length of a following sub-accumulation period.

The focus detection device according to the embodiment has an arrangement similar to that illustrated in FIG. 2A.

Figure 5:
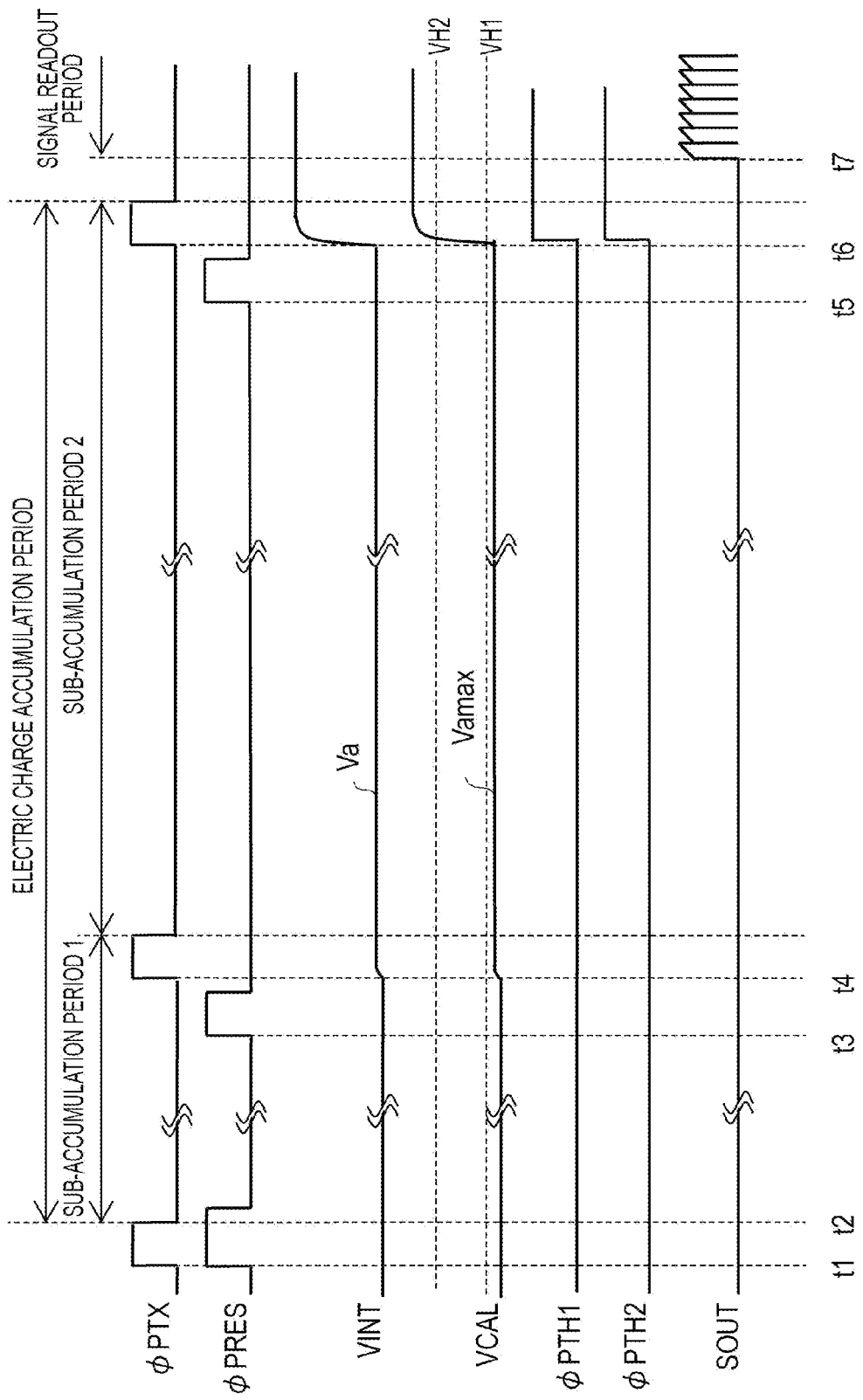
FIG. 5 is a diagram of an exemplary operation of a focus detection device.

FIG. 5 is a diagram of an operation of a focus detection device 1 according to the embodiment. A signal level VH1 is for determining the length of a sub-accumulation period 2 illustrated in FIG. 5. A signal level VH2 is for determining the timing to finish the electric charge accumulation period. A signal φPTH1 indicates a result of comparison by an arithmetic operation circuit 202 between a signal level of a signal VCAL and the signal level VH1. A signal φPTH2 indicates a result of comparison by the arithmetic operation circuit 202 between a signal level of the signal VCAL and the signal level VH2. The arithmetic operation circuit 202 outputs the signals φPTH1 and φPTH2 to a timing generation circuit 300. The timing generation circuit 300 controls the length of the sub-accumulation period 2 based on the signal φPTH1. The timing generation circuit 300 also controls the timing to finish the electric charge accumulation period based on the signal φPTH2.

Operations at times t1, t2, t3, and t4 are similar to those at the times t1, t2, t3, and t4 described with reference to FIG. 2B.

At the time t4, the timing generation circuit 300 turns a signal φPTX from the L level to the H level. This allows unit cells 100 to output to respective summation circuits 201 photoelectric conversion signals based on electric charges accumulated in photoelectric converters 101 in the sub-accumulation period 1 illustrated in FIG. 5. The signal VCAL has a signal level at Vamax. The signal level Vamax has an amplitude smaller than that of the signal level VH1. Thus, the signal φPTH1 remains at the L level. Because of the signal φPTH1 at the L level, the timing generation circuit 300 determines the timing to turn the signal φPTX to the H level so that the length of the sub-accumulation period 2 is longer than that of the sub-accumulation period 1.

An operation at a time t5 is similar to that at the time t5 described with reference to FIG. 2B.

At a time t6, the timing generation circuit 300 turns the signal φPTX from the L level to the H level again. The signal VCAL has a signal level with an amplitude larger than those of the signal levels VH1 and VH2. Thus, the signals φPTH1 and PTH2 both turns from the L level to the H level. Because of the signal PTH2 at the H level, the timing generation circuit 300 finishes the electric charge accumulation period for the photoelectric converters 101.

The focus detection device 1 according to the embodiment reduces in some cases the frequency at which the unit cells 100 output photoelectric conversion signals to the summation circuits 201 during the electric charge accumulation period, in comparison with the focus detection device 1 according to the first embodiment. This may allow the focus detection device 1 according to the embodiment to reduce the length from the start of the electric charge accumulation period until the output of post-CDS signals through a terminal SOUT, in comparison with the focus detection device 1 according to the first embodiment. Thus, a photoelectric conversion system including the focus detection device 1 according to the embodiment can achieve focus in a reduced length in some cases, in comparison with the focus detection device 1 according to the first embodiment.

The focus detection device according to the embodiment may determine the length of the electric charge accumulation period based on the timing at which the signal VCAL has reached a first signal level and the timing at which the signal VCAL has reached a second signal level, as in the third embodiment.

Fifth Embodiment

A focus detection device according to another embodiment will now be described with emphasis on differences from the fourth embodiment. For the focus detection device according to this embodiment, a level of a photoelectric conversion signal based on a sub-accumulation period is used to control the length of an electric charge accumulation period to be provided after the sub-accumulation period.

The focus detection device according to the embodiment has an arrangement similar to that illustrated in FIG. 2A.

Figure 6:
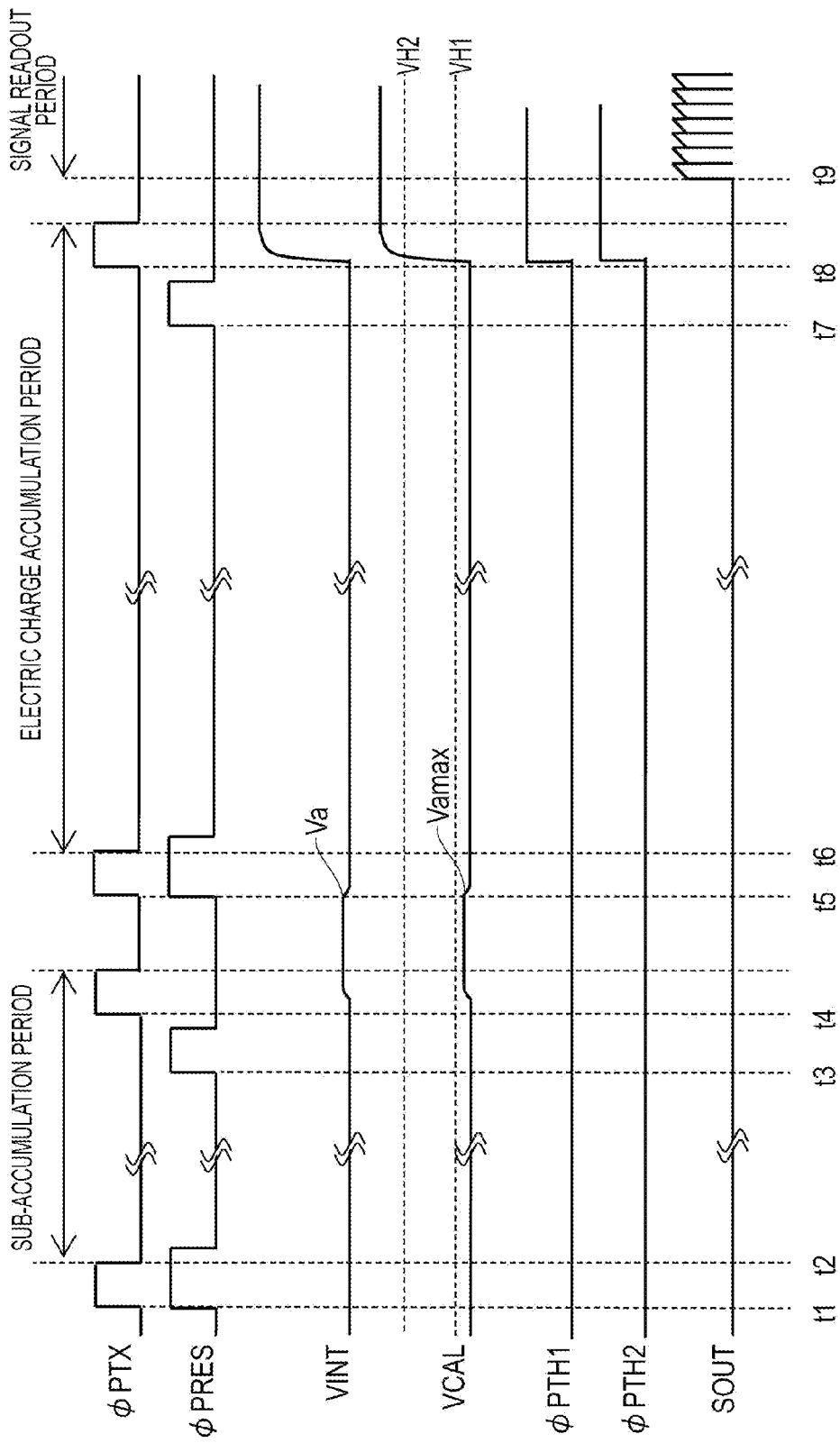
FIG. 6 is a diagram of an exemplary operation of a focus detection device.

FIG. 6 is a diagram of an operation of a focus detection device 1 according to the embodiment.

Operations at times t1, t2, t3, and t4 are similar to those at the times t1, t2, t3, and t4 described with reference to FIG. 5.

A timing generation circuit 300 determines the length of the electric charge accumulation period so that the electric charge accumulation period is longer than the sub-accumulation period because a signal φPTH1 is at the L level at a time t5.

At the time t5, the timing generation circuit 300 turns signals φPTX and φPRES from the L level to the H level. This resets electric charges at photoelectric converters 101 and the input nodes of transistors 103. The timing generation circuit 300 then turns the signal φPTX from the H level to the L level. This allows the photoelectric converters 101 to start accumulating electric charges. The timing generation circuit 300 then turns the signal φPRES from the H level to the L level. Summation circuits 201 reset their respective retained sum signals.

At a time t7, the timing generation circuit 300 turns the signal φPRES from the L level to the H level to reset the electric charges of the input nodes of the transistors 103. The timing generation circuit 300 then turns the signal φPRES from the H level to the L level.

At a time t8, the timing generation circuit 300 turns the signal φPTX from the L level to the H level. This allows unit cells 100 to output photoelectric conversion signals to the respective summation circuits 201. The electric charge accumulation period from the time t6 to the time t8 is longer than the sub-accumulation period from the time t2 to the time t4.

A signal VCAL has a signal level with an amplitude larger than those of the signal levels VH1 and VH2, causing the signals φPTH1 and PTH2 to turn from the L level to the H level. This allows the timing generation circuit 300 to finish the electric charge accumulation period for the photoelectric converters 101. If the signal VCAL has a signal level with an amplitude smaller than that of the signal level VH1, the signal φPTH1 remains at the L level. In this case, the timing generation circuit 300 performs an operation similar to the reset operation performed at the time t5 and then provides the electric charge accumulation period for the photoelectric converters 101 to allow the photoelectric converters 101 to accumulate electric charges again. The summation circuits 201 may then output to an arithmetic operation circuit 202 signals resulting from the addition of photoelectric conversion signals based on the added electric charge accumulation period and the photoelectric conversion signals input at the time t8.

If, at the time t8, the signal PTH1 is at the H level and the signal PTH2 is at the L level, the timing generation circuit 300 may perform an operation similar to the reset operation performed at the time t5 and then provide the electric charge accumulation period for the photoelectric converters 101.

The focus detection device 1 according to the embodiment also reduces in some cases the frequency at which the unit cells 100 output photoelectric conversion signals to the summation circuits 201 during the electric charge accumulation period, in comparison with the focus detection device 1 according to the first embodiment. This may allow the focus detection device 1 according to the embodiment to reduce the length from the start of the electric charge accumulation period until the output of post-CDS signals through a terminal SOUT, in comparison with the focus detection device 1 according to the first embodiment. Thus, a photoelectric conversion system including the focus detection device 1 according to the embodiment can achieve focus in a reduced length in some cases, in comparison with the focus detection device 1 according to the first embodiment.

The focus detection device according to the embodiment may determine the length of the electric charge accumulation period based on the timing at which the signal VCAL has reached a first signal level and the timing at which the signal VCAL has reached a second signal level, as in the third embodiment.

Sixth Embodiment

A focus detection device according to another embodiment will now be described with emphasis on differences from the first embodiment.

Unit cells 100 in the focus detection device according to this embodiment have a similar arrangement to that illustrated in FIG. 2A.

This embodiment has a different arrangement of a signal processing section 200 from that illustrated in FIG. 2A.

Figure 7:
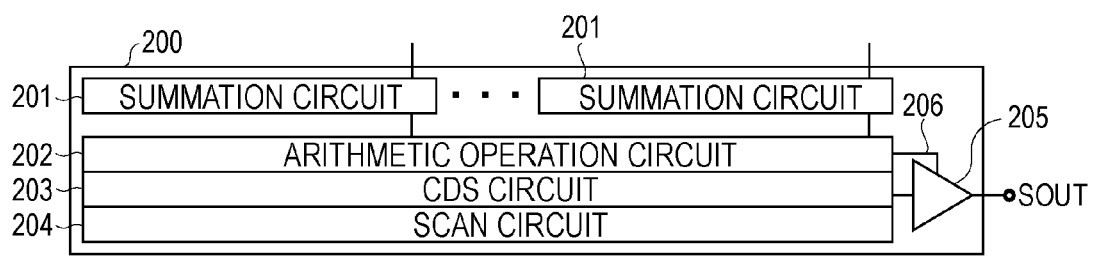
FIG. 7 is a diagram of an exemplary arrangement of a signal processing section for a focus detection device.

FIG. 7 is a diagram of the signal processing section 200 for the focus detection device according to the embodiment. The signal processing section 200 according to the embodiment includes an amplification circuit 205. An arithmetic operation circuit 202 controls the amplification ratio of the amplification circuit 205 through an amplification ratio control line 206. The amplification circuit 205 outputs to a terminal SOUT a signal resulting from amplification, which is based on an amplification ratio set by the arithmetic operation circuit 202, of a post-CDS signal output by a CDS circuit 203.

This allows the focus detection device according to the embodiment to obtain a signal resulting from the amplification of a post-CDS signal.

The signal processing section 200 for the focus detection device according to the embodiment will now be described in use with the focus detection device in the fifth embodiment. In the operation illustrated in FIG. 6, the signal level Vamax of the signal VCAL based on the sub-accumulation period has an amplitude smaller than that of the signal level VH1, allowing the signal φPTH1 to remain at the L level. The arithmetic operation circuit 202 sets a higher amplification ratio for the amplification circuit 205 when the signal φPTH1 is at the L level, in comparison with an amplification ratio to be set when the signal φPTH1 is at the H level. With the amplification circuit 205 outputting a signal resulting from the amplification of a post-CDS signal to the terminal SOUT, a photoelectric conversion system illustrated in FIG. 1 can detect a focus when the signal level of the signal VCAL based on the electric charge accumulation period is small.

Alternatively, the signal processing section 200 according to the embodiment illustrated in FIG. 7 may be included in the focus detection device according to the second embodiment. In this case, an arithmetic operation circuit 202 may obtain a time difference between the timing at which the signal VCAL2 has an amplitude larger than that of the signal level Vl and the timing at which the signal VCAL1 has an amplitude larger than that of the signal level Vh, as described with reference to FIG. 3. The arithmetic operation circuit 202 may set an amplification ratio for the amplification circuit 205 based on the time difference between the timing at which the signal VCAL2 has the amplitude larger than that of the signal level Vl and the timing at which the signal VCAL1 has the amplitude larger than that of the signal level Vh.

Seventh Embodiment

A focus detection device according to another embodiment will now be described with reference to the drawings.

Figure 8:
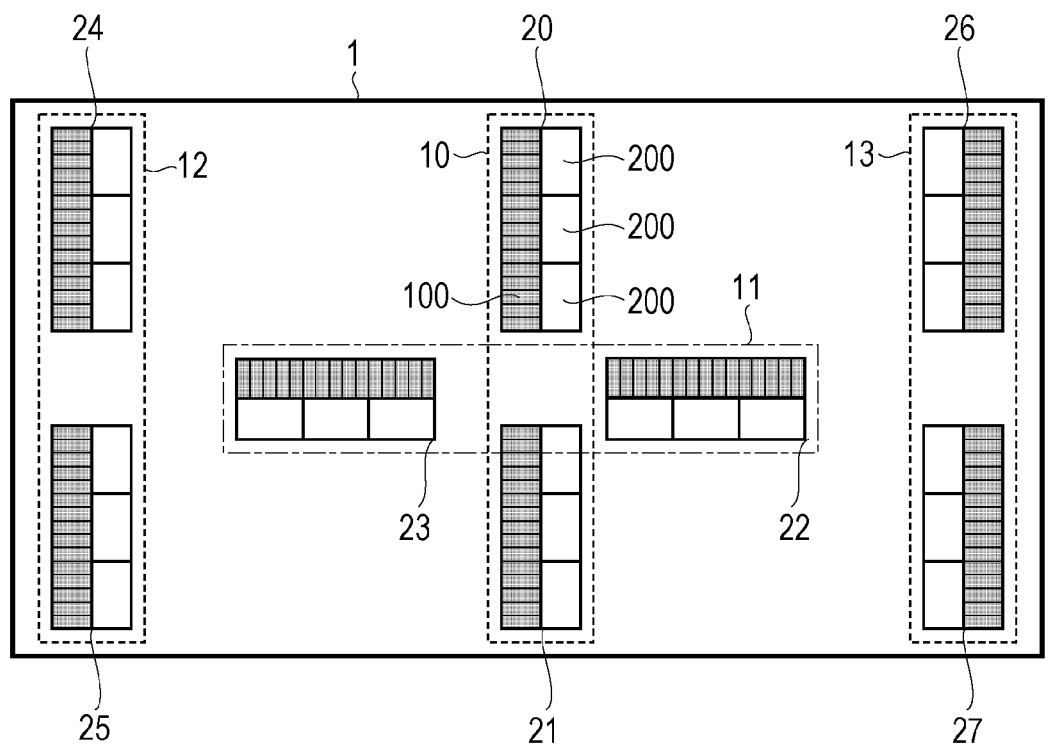
FIG. 8 is a diagram of an exemplary arrangement of a focus detection device.

FIG. 8 is a diagram of the focus detection device according to this embodiment.

The focus detection device illustrated in FIG. 8 includes line sensors 20 to 27 that each include a one-dimensional array of photoelectric converters 101.

The line sensors 20 to 27 are each divided into three regions. Each region includes a signal processing section 200 and a plurality of unit cells 100. The line sensors 20 and 21 constitute a line sensor pair 10. The line sensors 22 and 23 constitute a line sensor pair 11. The line sensors 24 and 25 constitute a line sensor pair 12. The line sensors 26 and 27 constitute a line sensor pair 13.

The line sensor pairs 10 to 13 are arranged in a manner such that one of two subject images resulting from the splitting by the secondary imaging lenses 3 and 4 illustrated in FIG. 1 enters each of the line sensors constituting each of the line sensor pairs.

With the arrangement of more than one line sensor pair, or the line sensor pairs 10 to 13 according to the embodiment, a plurality of ranging points can be provided for a subject image. Furthermore, more than one line sensor, or the line sensors 20 to 27, is divided into multiple regions, with each region including the signal processing section 200. Because of this, even more ranging points can be provided.

The focus detection device according to the embodiment includes the four line sensor pairs 10 to 13 with the line sensors 20 to 27 each divided into three regions. The number of the line sensor pairs and the number of regions divided in each line sensor for the focus detection device according to the embodiment are not limited thereto.

The present invention is capable of facilitating providing a more appropriate timing to finish an electric charge accumulation period for photoelectric converters.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-191569, filed Sep. 17, 2013, which is hereby incorporated by reference herein in its entirety.

What is claimed is:

1. A focus detection device, comprising a plurality of unit cells and an arithmetic operation circuit,
the unit cells each comprising:
a photoelectric converter;
a transfer switch configured to transfer an electric charge accumulated by the photoelectric converter; and
an output section configured to output a signal based on the electric charge transferred when the transfer switch is turned on,
wherein the output section outputs a plurality of signals based on electric charges obtained in a plurality of sub-accumulation periods included in an electric charge accumulation period, and
the arithmetic operation circuit determines a length of the electric charge accumulation period based on signal levels of the plurality of signals.

2. The focus detection device according to claim 1, further comprising summation circuits each associated with each of the unit cells,
wherein the summation circuits each generate a sum signal resulting from summation of the plurality of signals output by the output section, and
the arithmetic operation circuit determines a timing to finish the electric charge accumulation period based on signal levels of the sum signals generated by the summation circuits.

3. The focus detection device according to claim 2, wherein the arithmetic operation circuit determines the timing to finish the electric charge accumulation period based on a maximum value from the sum signals generated by the summation circuits.

4. The focus detection device according to claim 2, wherein the arithmetic operation circuit determines the timing to finish the electric charge accumulation period based on a minimum value and a maximum value from the sum signals generated by the summation circuits.

5. The focus detection device according to claim 2, wherein the arithmetic operation circuit determines the timing to finish the electric charge accumulation period based on a timing at which an amplitude from the sum signals has reached a first signal level and a timing at which an amplitude from the sum signals has reached a second signal level.

6. The focus detection device according to claim 1, wherein the arithmetic operation circuit uses a signal level of a signal output by the output section based on an electric charge accumulated in a first sub-accumulation period in the plurality of sub-accumulation periods to determine the timing to finish a sub-accumulation period to be provided after the first sub-accumulation period in the plurality of sub-accumulation periods.

7. The focus detection device according to claim 1, further comprising a CDS circuit,
wherein each of the unit cells further outputs a noise signal, and the CDS circuit generates a signal of difference between a signal based on the electric charges generated during the electric charge accumulation period and the noise signal.

8. A focus detection device, comprising a plurality of unit cells and an arithmetic operation circuit,
the unit cells each comprising:
a photoelectric converter configured to accumulate an electric charge based on incoming light in a sub-accumulation period;
a transfer switch configured to transfer the electric charge accumulated by the photoelectric converter; and
an output section configured to output a signal based on the electric charge transferred when the transfer switch is turned on,
wherein the arithmetic operation circuit determines a length of an electric charge accumulation period based on a signal level of the signal output by the output section included in each of the unit cells, the electric charge accumulation period being a period in which the photoelectric converter accumulates an electric charge, the electric charge accumulation period being provided after the sub-accumulation period.

9. The focus detection device according to claim 8, further comprising a CDS circuit, wherein each of the unit cells further outputs a noise signal, and the CDS circuit generates a signal of difference between a signal based on the electric charge generated during the electric charge accumulation period and the noise signal.

10. A focus detection device, comprising a plurality of unit cells and an arithmetic operation circuit,
the unit cells each comprising:
a photoelectric converter configured to accumulate an electric charge based on incoming light in a sub-accumulation period;
a transfer switch configured to transfer the electric charge accumulated by the photoelectric converter; and
an output section configured to output a signal based on the electric charge transferred when the transfer switch is turned on,
wherein the output section outputs a signal based on an electric charge resulting from summation of electric charges obtained in a plurality of sub-accumulation periods included in an electric charge accumulation period, and
the arithmetic operation circuit determines a length of the electric charge accumulation period based on a signal level of the signal output by the output section included in each of the unit cells, the electric charge accumulation period being a period in which the photoelectric converter accumulates the electric charges.

11. A photoelectric conversion system, comprising: the focus detection device according to claim 1; and
an arithmetic processing section configured to detect a focus by processing a signal output by the focus detection device.

12. The photoelectric conversion system according to claim 11, further comprising: an optical module configured to introduce incoming light to the focus detection device; and a drive section,
wherein the drive section drives the optical module based on a result of the focus detection by the arithmetic processing section.

13. A photoelectric conversion system, comprising: the focus detection device according to claim 7; and an arithmetic processing section configured to detect a focus by processing a signal output by the focus detection device.

14. A photoelectric conversion system, comprising: the focus detection device according to claim 10; and an arithmetic processing section configured to detect a focus by processing a signal output by the focus detection device.

15. A method of driving a focus detection device, the focus detection device comprising a plurality of unit cells,
the unit cells each comprising:
a photoelectric converter;
a transfer switch configured to transfer an electric charge accumulated by the photoelectric converter; and
an output section configured to output a signal based on the electric charge transferred when the transfer switch is turned on, the method comprising:
outputting, by the output section, a plurality of signals based on electric charges obtained in a plurality of sub-accumulation periods included in an electric charge accumulation period; and
determining a timing to finish the electric charge accumulation period based on signal levels of the plurality of signals, the electric charge accumulation period being a period in which the photoelectric converter accumulates the electric charges.

16. The method of driving the focus detection device according to claim 15, further comprising:
generating for each of the unit cells a sum signal resulting from summation of the plurality of signals output from each of the unit cells in the plurality of sub-accumulation periods so as to generate sum signals; and
determining a length of the electric charge accumulation period based on signal levels of the sum signals, the electric charge accumulation period being a period in which the photoelectric converter accumulates the electric charges.

17. The method of driving the focus detection device according to claim 16, wherein the timing to finish the electric charge accumulation period is determined based on a sum signal having a maximum value from among the sum signals.

18. The method of driving the focus detection device according to claim 16, wherein the timing to finish the electric charge accumulation period is determined based on sum signals having a minimum value and a maximum value from among the sum signals.

19. The method of driving the focus detection device according to claim 16, wherein the timing to finish the electric charge accumulation period is determined based on a timing at which an amplitude from the sum signals has reached a first signal level and a timing at which an amplitude from the sum signals has reached a second signal level.

20. The method of driving the focus detection device according to claim 15, wherein a signal level of a signal output from each of the unit cells based on an electric charge accumulated in a first sub-accumulation period in the plurality of sub-accumulation periods is used to determine the timing to finish a sub-accumulation period to be provided after the first sub-accumulation period in the plurality of sub-accumulation periods.

21. A method of driving a focus detection device, the focus detection device comprising a plurality of unit cells,
the unit cells each comprising:
a photoelectric converter configured to accumulate an electric charge based on incoming light in a sub-accumulation period;
a transfer switch configured to transfer the electric charge accumulated by the photoelectric converter; and
an output section configured to output a signal based on the electric charge transferred when the transfer switch is turned on, the method comprising
determining a length of an electric charge accumulation period based on a signal level of the signal from each of the unit cells, the electric charge accumulation period being a period in which the photoelectric converter accumulates an electric charge, the electric charge accumulation period being provided after the sub-accumulation period.

* * * * *